A. BREYDEL.
APPARATUS FOR TREATING OILS, LIQUEFIED GREASES AND FATS, OR ANY OTHER LIQUIDS WITH NASCENT OZONE.
APPLICATION FILED APR. 3, 1914.

1,180,372.       Patented Apr. 25, 1916.

Witnesses:

Inventor
Albert Breydel
By his Attorneys

UNITED STATES PATENT OFFICE.

ALBERT BREYDEL, OF BRUSSELS, BELGIUM.

APPARATUS FOR TREATING OILS, LIQUEFIED GREASES AND FATS, OR ANY OTHER LIQUIDS WITH NASCENT OZONE.

1,180,372.                Specification of Letters Patent.        Patented Apr. 25, 1916.

Application filed April 3, 1914. Serial No. 829,205.

*To all whom it may concern:*

Be it known that I, ALBERT BREYDEL, a subject of the King of Belgium, residing at Brussels, in the Kingdom of Belgium, have invented certain new and useful Improvements in Apparatus for Treating Oils, Liquefied Greases and Fats, or any other Liquids with Nascent Ozone, of which the following is a specification.

My invention relates to an apparatus for treating oils, liquefied greases and fats or any other liquids with nascent ozone, of the kind in which electrodes immersed in the liquid to be treated have an electric current passed between them, oxygen or air at the same time being passed through the liquid for the purpose of producing ozone and so ozonizing the liquid.

One object of my invention is to utilize all the nascent ozone produced, with its full power while at the same time the liquid under treatment is kept automatically in motion without the use of any moving mechanism whatever.

A further object of my invention is to secure suitable and particularly simple means whereby the concentration of the ozone can be easily controlled so as to obtain a maximum output. And a further object of my invention is to automatically cool the electrodes without necessitating the use of cooling agents.

With these objects in view my invention essentially consists in the special arrangement and combinations of parts as hereinafter fully described and pointed out in the appended claims.

Figure 1:
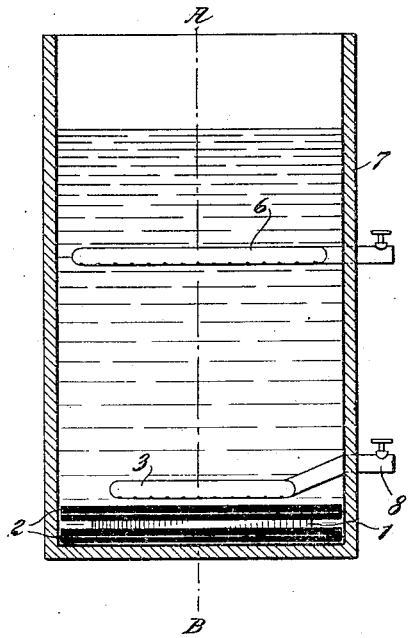
Figure 2:
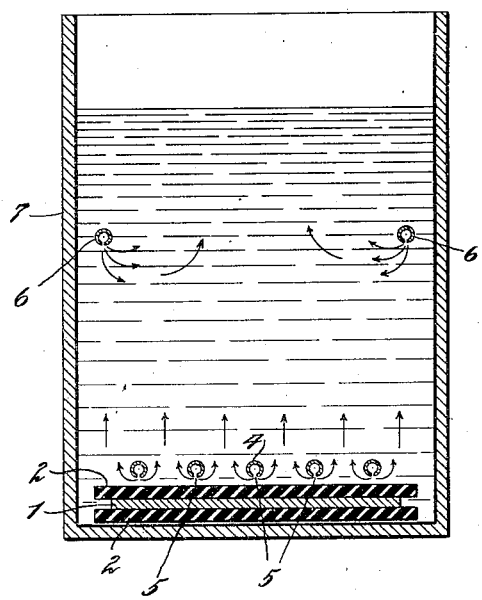
Figure 3:
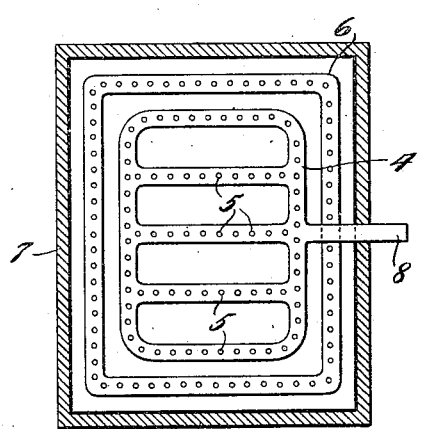

Referring to the annexed drawings: Figure 1 is a vertical section of an apparatus constructed according to my invention. Fig. 2 is a cross-section on line A—B, Fig. 1. Fig. 3 is a transverse section taken between the two electrodes.

In an apparatus constructed according to my invention, the air or oxygen, is delivered into the mass of the liquid and between the electrodes by one of the electrodes itself, at the surface of which it is ozonized while at the same time it continually agitates or keeps in motion the liquid under treatment.

In carrying out my invention, in practice I employ a hollow electrode disposed in a reservoir or vessel containing the mass to be ozonized, this electrode being formed with small orifices which discharge the air opposite the second electrode of the ozonizing apparatus in such manner that the ozonized air or oxygen is utilized at the very surface of the electrodes, and by its discharge from the orifices of the hollow electrode it keeps in motion and mixes the mass under treatment. If desired the keeping in motion and mixing of the mass may be rendered more energetic by the employment of a perforated ring, coil or the like, independent of the electrode of the ozonizer, and serving to supply fresh air for aerating the liquid.

The apparatus shown on the drawing comprises a rectangular or other vessel 7, preferably long and narrow, containing the liquid to be treated, say oil or liquefied grease. At the bottom of this vessel is the ozonizer, completely immersed in the liquid to be ozonized. The ozonizer comprises an electrode 1, of any suitable form, disposed between two plates, 2, of dielectric material. At a very small distance above the upper plate, 2, is disposed the second electrode, 3, which is in the form of a tubular grid, 4, or of a coil or spiral of any shape. This electrode is made of a material unattackable by ozone but capable of conducting electricity, or at least coated or faced with conducting material at its under part. This hollow electrode, 3, is connected to a pipe or conduit 8, for the supply of external air or oxygen.

The air or oxygen escapes through small orifices or perforations 5, in the under face of the hollow electrode, 3. There is thus an abundant production of ozone between the two electrodes owing to the renewal of the air, and this ozone is utilized in the nascent state at the very surface of the electrodes, while the liquid is kept in motion by the introduction of the air. As shown in the drawing the ozonized liquid may be aerated and the mixing rendered more energetic by the employment of a perforated ring or coil, 6, disposed at a suitable point, say about half way up the vessel, 7, and serving for the injection of fresh air.

By means of the apparatus described, liquids can be treated at any temperature, without it being necessary to have recourse to cooling agents, and all the nascent ozone produced is utilized with its full power.

What I claim is:

1. In an apparatus of the class described, a vessel adapted to contain the mass to be treated, an ozonizer positioned within said vessel and adapted to be covered by the mass to be treated, said ozonizer comprising two electrodes, one of said electrodes being hollow, and connections leading to said hollow electrode for supplying the air or oxygen to be ozonized which is thus introduced into the mass to be treated through said hollow electrode itself.

2. In an apparatus of the class described, a vessel adapted to contain the mass to be treated, an ozonizer positioned within said vessel and adapted to be covered by the mass to be treated, said ozonizer comprising two electrodes, one of said electrodes being hollow and having small orifices therein, and a second electrode separated from said hollow electrode and positioned opposite the small orifices in the hollow electrode, and connections for supplying air or oxygen to the hollow electrode, whereby it is discharged through the small orifices therein and is ozonized, the air or oxygen being discharged under pressure whereby the discharge thereof through the small orifices will agitate and mix the mass to be treated.

3. In an apparatus of the class described, a vessel adapted to contain the mass to be treated, an ozonizer positioned within said vessel and adapted to be covered by the mass to be treated, said ozonizer comprising a hollow electrode having small orifices therein and connections thereto for supplying the air or oxygen to be ozonized, a second electrode separated from and opposite the small orifices in the hollow electrode, and an auxiliary means in said vessel for injecting air into the mass to be treated to aerate and agitate the same.

In testimony whereof I have affixed my signature in presence of two witnesses.

ALBERT BREYDEL.

Witnesses:
  JACQUES BEDE,
  CHAS. ROY NASMITH.